(12) United States Patent
Miyano

(10) Patent No.: US 7,486,449 B2
(45) Date of Patent: Feb. 3, 2009

(54) OBJECTIVE LENS FOR ENDOSCOPE, AND IMAGING APPARATUS FOR ENDOSCOPE USING THE SAME

(75) Inventor: Hitoshi Miyano, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/905,341

(22) Filed: Sep. 28, 2007

(65) Prior Publication Data

US 2008/0080061 A1 Apr. 3, 2008

(30) Foreign Application Priority Data

Sep. 29, 2006 (JP) ............................ P2006-267348

(51) Int. Cl.
*G02B 9/34* (2006.01)
*G02B 9/60* (2006.01)
(52) U.S. Cl. ...................................... 359/781; 359/770
(58) Field of Classification Search ................. 359/770, 359/781, 793
See application file for complete search history.

(56) References Cited

U.S. PATENT DOCUMENTS 5,936,778 A * 8/1999 Miyano et al. ............... 359/660

FOREIGN PATENT DOCUMENTS

JP 10-260348 A 9/1998

* cited by examiner

*Primary Examiner*—William C Choi
(74) *Attorney, Agent, or Firm*—Birch, Stewart, Kolasch & Birch, LLP

(57) ABSTRACT

A front group consists of two concave lenses. A rear group consists of: a positive lens in which the object-side surface has a larger radius of curvature; and a cemented lens configured by a positive lens in which the object-side surface has a larger radius of curvature, and a negative meniscus lens, the cemented lens having being positive as a whole. An objective lens satisfies the following conditional expressions:

$$|d_x/f_F| \geq 3.0 \quad (1)$$

$$(f/f_3) \times v_{3} < 23 \quad (2)$$

$$f^2 \times (v_5 - v_4)/\{R_A \times (Bf + d_5/n_5)\} > 7 \quad (3)$$

where $d_x$ is the distance between the groups, f, $f_F$, and $f_3$ are the focal lengths of the objective lens, the front group, and the lens, respectively, $v_3$, $v_4$, and $v_5$ are the Abbe numbers of the lenses, $R_A$ is the radius of curvature of the cementing surface between the lenses, $B_f$ is the back focus, and $d_5$ and $n_5$ are the center thickness and refractive index with respect to the d-line of the lens.

2 Claims, 17 Drawing Sheets

EXAMPLE 1

EXAMPLE 1

EXAMPLE 3

EXAMPLE 4

EXAMPLE 5

EXAMPLE 6

| EXAMPLE 1: LENS DATA | | | | | |
|---|---|---|---|---|---|
| | Si (SURFACE NUMBER) | Ri (RADIUS OF CURVATURE) | Di (ON-AXIS SUR-FACE SPACING) | ndj (REFRACTIVE INDEX) | νdj (ABBE NUMBER) |
| GF | 1 | ∞ | 0.42019 | 1.88300 | 40.8 |
| | 2 | 0.9337 | 0.20901 | | |
| | 3 | 2.8071 | 0.42019 | 1.62041 | 60.3 |
| | 4 | 0.9339 | 1.08887 | | |
| | 5 | APERTURE | 0.04902 | | |
| GR | 6 | 62.1952 | 1.31661 | 1.68500 | 49.2 |
| | 7 | -1.4993 | 0.61342 | | |
| | 8 | 2.7861 | 1.21857 | 1.48749 | 70.4 |
| | 9 | -1.4006 | 0.49023 | 1.92285 | 18.9 |
| | 10 | -3.5618 | 1.28409 | | |
| GP | 11 | ∞ | 3.00000 | 1.55920 | 53.9 |
| | 12 | ∞ | | | |

FIG. 9

| | EXAMPLE 2: LENS DATA | | | | |
|---|---|---|---|---|---|
| | Si (SURFACE NUMBER) | Ri (RADIUS OF CURVATURE) | Di (ON-AXIS SURFACE SPACING) | ndj (REFRACTIVE INDEX) | νdj (ABBE NUMBER) |
| GF | 1 | ∞ | 0.42050 | 1.88300 | 40.9 |
| | 2 | 0.9294 | 0.19346 | | |
| | 3 | 2.1969 | 0.42050 | 1.88300 | 40.9 |
| | 4 | 0.9296 | 1.04149 | | |
| | 5 | APERTURE | 0.04906 | | |
| GR | 6 | -14.1755 | 1.31757 | 1.68250 | 44.5 |
| | 7 | -1.4393 | 0.67407 | | |
| | 8 | 3.2719 | 1.21946 | 1.64250 | 58.1 |
| | 9 | -1.4017 | 0.49059 | 1.92285 | 18.9 |
| | 10 | -6.0581 | 1.53713 | | |
| GP | 11 | ∞ | 3.00000 | 1.55920 | 53.9 |
| | 12 | ∞ | | | |

FIG. 10

| | EXAMPLE 3: LENS DATA | | | | |
|---|---|---|---|---|---|
| | Si (SURFACE NUMBER) | Ri (RADIUS OF CURVATURE) | Di (ON-AXIS SURFACE SPACING) | ndj (REFRACTIVE INDEX) | νdj (ABBE NUMBER) |
| GF | 1 | 14.8035 | 0.43065 | 1.88300 | 40.9 |
| | 2 | 0.9578 | 0.21527 | | |
| | 3 | 3.5425 | 0.43065 | 1.69680 | 55.6 |
| | 4 | 0.9578 | 1.11713 | | |
| | 5 | APERTURE | 0.05024 | | |
| GR | 6 | -9.0087 | 1.34937 | 1.68250 | 44.5 |
| | 7 | -1.4778 | 0.63380 | | |
| | 8 | 4.2661 | 1.24888 | 1.63854 | 55.5 |
| | 9 | -1.4355 | 0.50242 | 1.92285 | 18.9 |
| | 10 | -4.4675 | 1.73954 | | |
| GP | 11 | ∞ | 3.00000 | 1.51633 | 64.1 |
| | 12 | ∞ | | | |

FIG. 11

| | | | EXAMPLE 4: LENS DATA | | |
|---|---|---|---|---|---|
| | Si (SURFACE NUMBER) | Ri (RADIUS OF CURVATURE) | Di (ON-AXIS SURFACE SPACING) | ndj (REFRACTIVE INDEX) | νdj (ABBE NUMBER) |
| GF | 1 | ∞ | 0.36652 | 1.88300 | 40.9 |
| | 2 | 0.8136 | 0.18186 | | |
| | 3 | 1.7633 | 0.36652 | 1.51633 | 64.1 |
| | 4 | 0.8346 | 0.93918 | | |
| | 5 | APERTURE | 0.04276 | | |
| GR | 6 | 7.4139 | 1.14844 | 1.60323 | 42.5 |
| | 7 | -1.3430 | 0.28200 | | |
| | 8 | 4.0173 | 1.06292 | 1.62041 | 60.3 |
| | 9 | -1.1607 | 0.42761 | 1.92285 | 18.9 |
| | 10 | -3.4460 | 1.26736 | | |
| GP | 11 | ∞ | 3.00000 | 1.55920 | 53.9 |
| | 12 | ∞ | | | |

FIG. 12

| | | | EXAMPLE 5: LENS DATA | | |
|---|---|---|---|---|---|
| | Si (SURFACE NUMBER) | Ri (RADIUS OF CURVATURE) | Di (ON-AXIS SURFACE SPACING) | ndj (REFRACTIVE INDEX) | νdj (ABBE NUMBER) |
| GF | 1 | ∞ | 0.37274 | 1.88532 | 40.9 |
| | 2 | 0.8279 | 0.25586 | | |
| | 3 | 4.1158 | 0.37274 | 1.48824 | 70.4 |
| | 4 | 0.8217 | 0.97183 | | |
| | 5 | APERTURE | 0.04349 | | |
| GR | 6 | 6.5128 | 1.16793 | 1.60475 | 42.5 |
| | 7 | -1.3672 | 0.39154 | | |
| | 8 | 3.0557 | 1.08095 | 1.51721 | 64.1 |
| | 9 | -1.1804 | 0.43487 | 1.92800 | 18.9 |
| | 10 | -3.1474 | 1.58723 | | |
| GP | 11 | ∞ | 3.00000 | 1.56032 | 53.9 |
| | 12 | ∞ | | | |

FIG. 13

| | EXAMPLE 6: LENS DATA | | | | |
|---|---|---|---|---|---|
| | Si (SURFACE NUMBER) | Ri (RADIUS OF CURVATURE) | Di (ON-AXIS SURFACE SPACING) | ndj (REFRACTIVE INDEX) | νdj (ABBE NUMBER) |
| GF | 1 | 12.7327 | 0.37800 | 1.88300 | 40.8 |
| GF | 2 | 0.8390 | 0.25602 | | |
| GF | 3 | 4.1994 | 0.37800 | 1.48749 | 70.4 |
| GF | 4 | 0.8318 | 0.98357 | | |
| | 5 | APERTURE | 0.04410 | | |
| GR | 6 | 13.0425 | 1.18441 | 1.60323 | 42.5 |
| GR | 7 | -1.3576 | 0.47602 | | |
| GR | 8 | 4.2929 | 1.09621 | 1.62041 | 60.3 |
| GR | 9 | -1.1970 | 0.44100 | 1.90679 | 21.2 |
| GR | 10 | -3.6363 | 1.52944 | | |
| GP | 11 | ∞ | 3.00000 | 1.51633 | 64.1 |
| GP | 12 | ∞ | | | |

FIG. 14

VALUES RELATING TO CONDITIONAL EXPRESSIONS, ETC

| | EXAMPLE 1 | EXAMPLE 2 | EXAMPLE 3 | EXAMPLE 4 | EXAMPLE 5 | EXAMPLE 6 | COMPARATIVE EXAMPLE |
|---|---|---|---|---|---|---|---|
| IMAGE SIZE (φ) (mm) | 1.80 | 1.80 | 1.80 | 1.60 | 1.60 | 1.60 | 1.80 |
| OBJECT DISTANCE (mm) | -10 | -10 | -10 | -10 | -10 | -10 | -10 |
| FIELD ANGLE (2ω) (°) | 117.6 | 117.9 | 112.9 | 100.2 | 99.6 | 97.2 | 117.0 |
| FOCAL LENGTH (mm) | 1.000 | 1.000 | 1.000 | 1.000 | 1.000 | 1.000 | 1.000 |
| BACK FOCUS (mm) | 3.115 | 3.368 | 3.625 | 3.097 | 3.415 | 3.414 | 3.566 |
| COMPOSITE FOCAL LENGTH OF GF (mm) | -0.627 | -0.588 | -0.631 | -0.631 | -0.552 | -0.598 | -0.695 |
| POSITION OF REAR PRINCIPAL POINT OF GF (mm) | -0.235 | -0.170 | -0.206 | -0.237 | -0.278 | -0.266 | -0.261 |
| POSITION OF FRONT PRINCIPAL POINT OF GR (mm) | 1.004 | 1.018 | 1.179 | 0.872 | 0.834 | 0.978 | 1.208 |
| FOCAL LENGTH OF L3 (mm) | 2.155 | 2.253 | 2.415 | 1.983 | 1.984 | 2.103 | 2.180 |
| AXIAL CHROMATIC ABERRATION (F-LINE - C-LINE) (μm) | 12.8 | 52.6 | 29.3 | 43.7 | 53.3 | 8.8 | 46.3 |
| LATERAL CHROMATIC ABERRATION AT EXTREME FIELD ANGLE (F-LINE - C-LINE) (μm) | -5.6 | -1.3 | -4.0 | -3.8 | -4.2 | -5.1 | -11.0 |
| CONDITIONAL EXPRESSION (1) | 3.79 | 3.87 | 4.05 | 3.31 | 3.85 | 3.80 | 3.58 |
| CONDITIONAL EXPRESSION (2) | 22.83 | 19.75 | 18.43 | 21.43 | 21.44 | 20.20 | 27.66 |
| CONDITIONAL EXPRESSION (3) | 11.82 | 8.30 | 7.03 | 11.52 | 11.23 | 9.57 | 9.27 |

COMPARATIVE EXAMPLE

| | Si (SURFACE NUMBER) | Ri (RADIUS OF CURVATURE) | Di (ON-AXIS SURFACE SPACING) | ndj (REFRACTIVE INDEX) | νdj (ABBE NUMBER) |
|---|---|---|---|---|---|
| | COMPARATIVE EXAMPLE: LENS DATA ||||||
| GF | 1 | ∞ | 0.42570 | 1.88300 | 41.0 |
| GF | 2 | 0.9977 | 0.22710 | | |
| GF | 3 | 3.5535 | 0.42570 | 1.62041 | 60.3 |
| GF | 4 | 1.1041 | 0.96500 | | |
| | 5 | APERTURE | 0.05680 | | |
| GR | 6 | ∞ | 1.33400 | 1.62041 | 60.3 |
| GR | 7 | -1.3524 | 0.14190 | | |
| GR | 8 | 12.6871 | 1.23470 | 1.62041 | 60.3 |
| GR | 9 | -1.1041 | 0.49670 | 1.84666 | 23.8 |
| GR | 10 | -2.6978 | 0.45000 | | |
| GP | 11 | ∞ | 4.96650 | 1.53996 | 59.7 |
| GP | 12 | ∞ | | | |

COMPARATIVE EXAMPLE

OBJECTIVE LENS FOR ENDOSCOPE, AND IMAGING APPARATUS FOR ENDOSCOPE USING THE SAME

BACKGROUND OF THE INVENTION

1. Field of the Invention

The present invention relates to an objective lens which is to be disposed in a tip end portion of an endoscope, more particularly to an objective lens for endoscope (hereinafter, often referred to as endoscope objective lens) in which an optical-path deflecting prism is placed on the side of the image-side surface, and also to an imaging apparatus for endoscope using it.

2. Description of the Related Art

In the related art, as a direct-view type endoscope using a solid-state image pickup device such as a CCD (Charge Coupled Device), an endoscope in which a solid-state image pickup device is placed in a tip end portion parallel to the axial direction is known. In such an endoscope, usually, a prism for deflecting the optical path is inserted and placed via a cover glass and the like between the solid-state image pickup device and an objective lens. The size of the optical-path deflecting prism depends on the image size. In order to insert the optical-path deflecting prism, therefore, the distance between the final surface of the objective lens and the imaging position, i.e., the back focus must be sufficiently ensured.

By contrast, in accordance with miniaturization of a solid-state image pickup device, also the image size is reducing. When a sufficient margin is not provided to the distance between a wall surface of the prism and the effective light flux, however, flare or ghost is caused. When the processing accuracy of components and the assembly accuracy are considered, the distance cannot be extremely shortened, and the size of the prism is hardly reduced in proportion to the image size. Therefore, it is requested to develop an objective lens having a back focus which is sufficiently long with respect to the focal length of the objective lens.

In an endoscope objective lens, in order to cope with the request for a wider angle, however, the focal length tends to be shorter even when the image size is identical, and therefore it is difficult to obtain a sufficient back focus. The assignee of the present invention has proposed an endoscope objective lens in which, in a tip end portion of an endoscope, an optical-path deflecting prism can be inserted and placed between a solid-state image pickup device placed parallel to the axial direction and the objective lens, and which has a back focus that is sufficiently long with respect to the focal length (JP-A-10-260348). JP-A-10-260348 discloses a configuration in which a front-group divergent lens system and a rear-group convergent lens system are placed on both sides of an aperture diaphragm, respectively. In the configuration, particularly, optical elements of the front-group divergent lens system are set so as to satisfy predetermined conditional expressions, so that, while aberrations are corrected, a back focus which is three or more times the focal length of the objective lens can be ensured.

In the configuration of JP-A-10-260348, however, correction of lateral chromatic aberration is insufficient as compared with that of axial chromatic aberration, and therefore the correction balance between axial chromatic aberration and lateral chromatic aberration is requested to be improved. Recently, as the high resolution of a solid-state image pickup device is further advancing and the number of pixels is more increasing, it is further required to sufficiently correct lateral chromatic aberration. Therefore, it is requested to realize an endoscope objective lens in which both of axial chromatic aberration and lateral chromatic aberration are satisfactorily corrected while ensuring a back focus having a sufficient length that allows insertion placement of an optical-path deflecting prism.

SUMMARY OF THE INVENTION

The invention has been conducted in view of the problems. It is an object of the invention to provide an endoscope objective lens in which axial chromatic aberration and lateral chromatic aberration can be satisfactorily corrected in a well balanced manner while ensuring a back focus having a sufficient length that allows insertion placement of an optical-path deflecting prism, and an imaging apparatus for endoscope which uses the endoscope objective lens, and which can obtain an excellent observation image.

The objective lens for endoscope of the invention comprises, in order from an object side: a front-group divergent lens system; an aperture diaphragm; and a rear-group convergent lens system, wherein the front-group divergent lens system comprises first and second lenses which are negative lenses, the rear-group convergent lens system is configured in order from an object side by: a positive third lens in which an object-side surface is larger in absolute value of a radius of curvature than an image-side surface; and a cemented lens configured by a positive fourth lens in which an object-side surface is larger in absolute value of a radius of curvature than an image-side surface and a fifth lens having a negative refractive power and a meniscus shape, the cemented lens having a positive refractive power as a whole, and the objective lens satisfies following conditional expressions:

$$|d_x/f_F| \geq 3.0 \tag{1}$$

$$(f/f_3) \times v_3 < 23 \tag{2}$$

$$f^2 \times (v_5 - v_4)/\{R_A \times (Bf + d_5/n_5)\} > 7 \tag{3}$$

where $d_x$ is a distance between a rear principal point of the front-group divergent lens system and a front principal point of the rear-group convergent lens system, $f_F$ is a composite focal length of the front-group divergent lens system, f is a composite focal length of the objective lens, $f_3$ is a focal length of the third lens, $v_3$ is the Abbe number of the third lens, $v_4$ is the Abbe number of the fourth lens, $v_5$ is the Abbe number of the fifth lens, $R_A$ is a radius of curvature of a cementing surface between the fourth lens and the fifth lens, $B_f$ is a back focus of the objective lens, $d_5$ is a center thickness of the fifth lens, and $n_5$ is a refractive index of the fifth lens with respect to the d-line.

The imaging apparatus for endoscope of the invention comprises an objective lens for endoscope having the above-described configuration, and an image pickup device that outputs an image signal corresponding to an optical image formed by the endoscope objective lens.

According to the objective lens for endoscope of the invention, in the optical system in which the front-group divergent lens system and the rear-group convergent lens system are placed on both sides of the aperture diaphragm, the refractive powers and shapes of the lenses of the groups are adequately set, and conditional expression (1) is satisfied, whereby a long back focus which is three or more times the focal length of the objective lens is ensured. Particularly, the optical elements of the rear-group convergent lens system satisfy conditional expressions (2) and (3), thereby allowing both axial chromatic aberration and lateral chromatic aberration to be satisfactorily corrected in a well balanced manner.

In the imaging apparatus for endoscope of the invention, a high-resolution image signal is obtained on the basis of an excellent optical image produced by the objective lens for endoscope of the invention.

BRIEF DESCRIPTION OF THE DRAWINGS

FIG. 9 shows lens data of an endoscope objective lens of Example 2 of the invention;

FIG. 10 shows lens data of an endoscope objective lens of Example 3 of the invention;

FIG. 11 shows lens data of an endoscope objective lens of Example 4 of the invention;

FIG. 12 shows lens data of an endoscope objective lens of Example 5 of the invention;

FIG. 13 shows lens data of an endoscope objective lens of Example 6 of the invention;

FIG. 14 is a view collectively showing values relating to conditional expressions and the like for the examples;

DETAILED DESCRIPTION OF THE INVENTION

Hereinafter, an embodiment of the invention will be described in detail with reference to the accompanying drawings.

Figure 1:
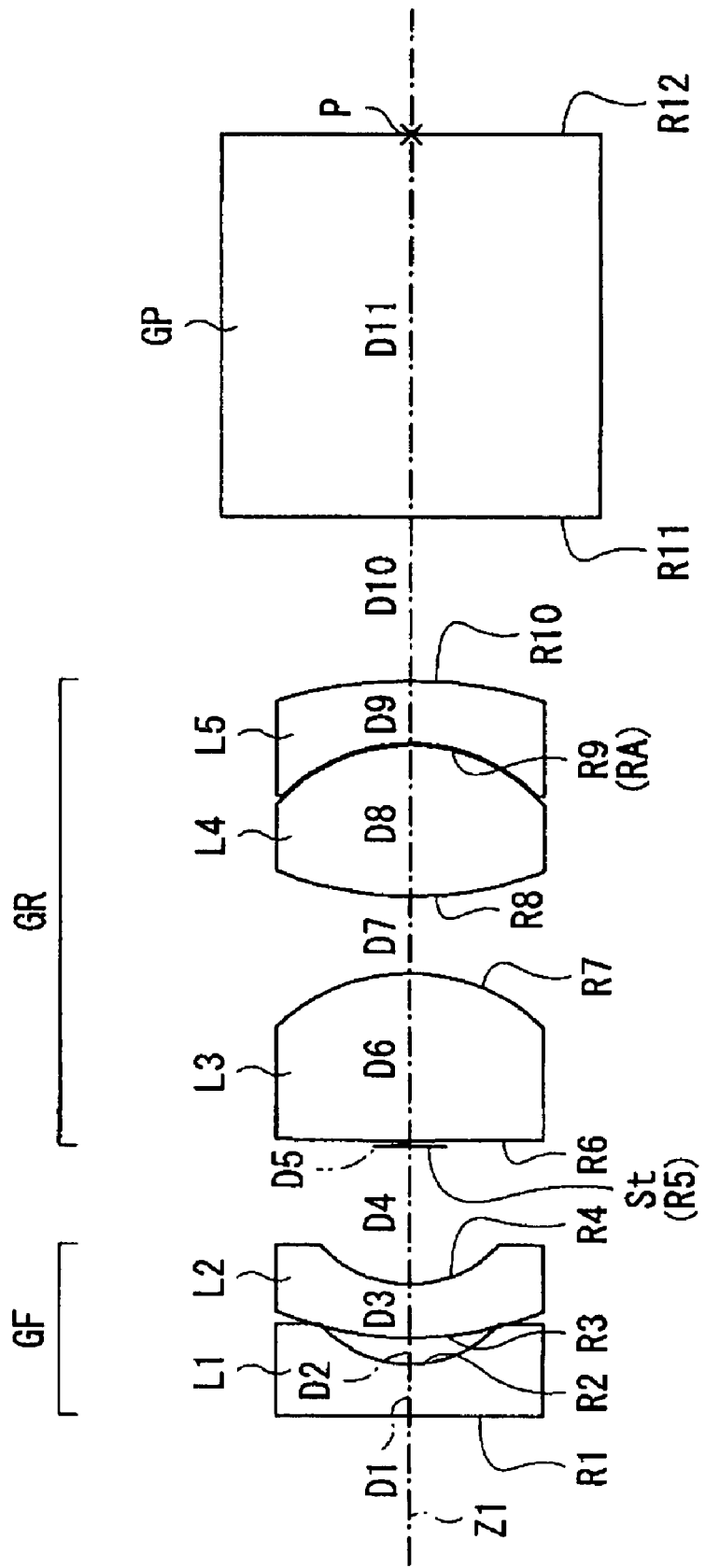
FIG. 1 is a lens section view corresponding to Example 1 and showing a first configuration example of an endoscope objective lens of an embodiment of the invention.
Figure 2:
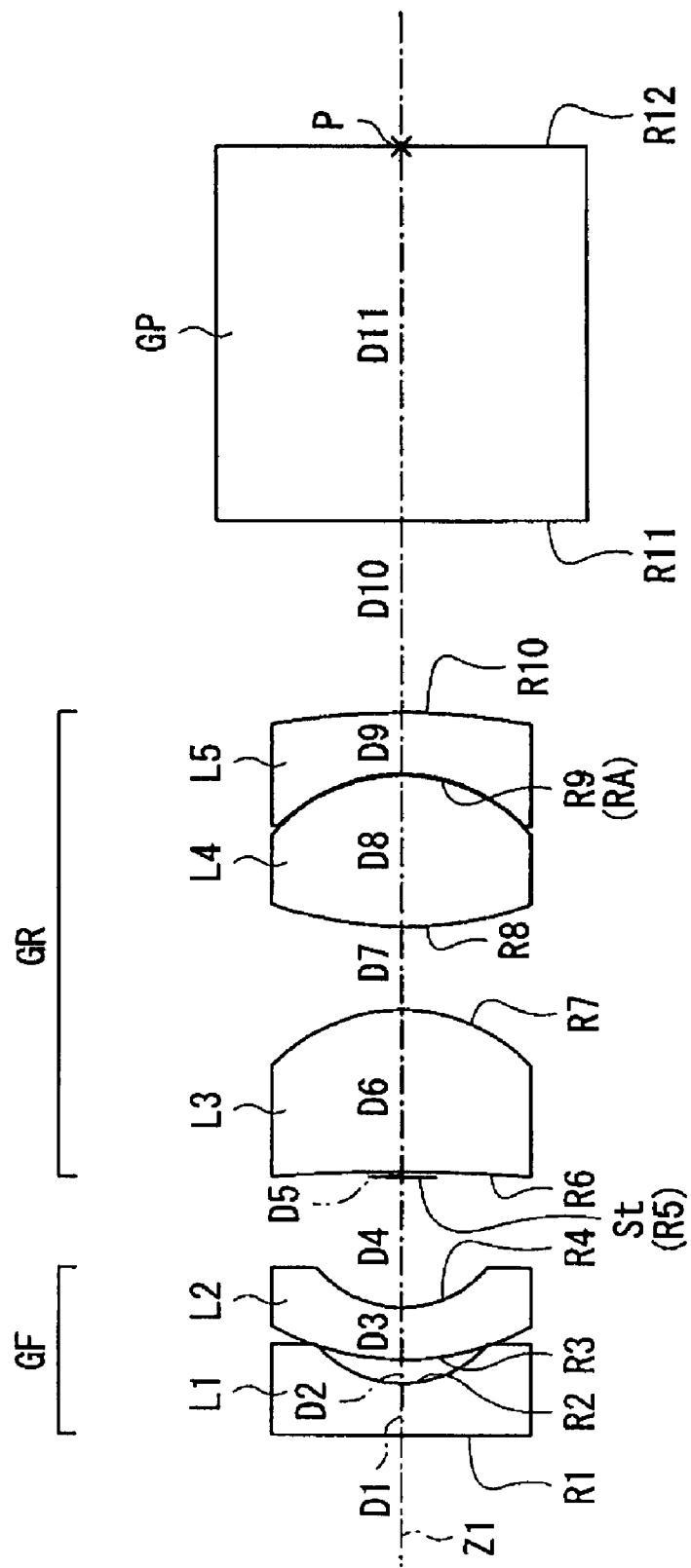
FIG. 2 is a lens section view corresponding to Example 2 and showing a second configuration example of the endoscope objective lens of the embodiment of the invention.
Figure 3:
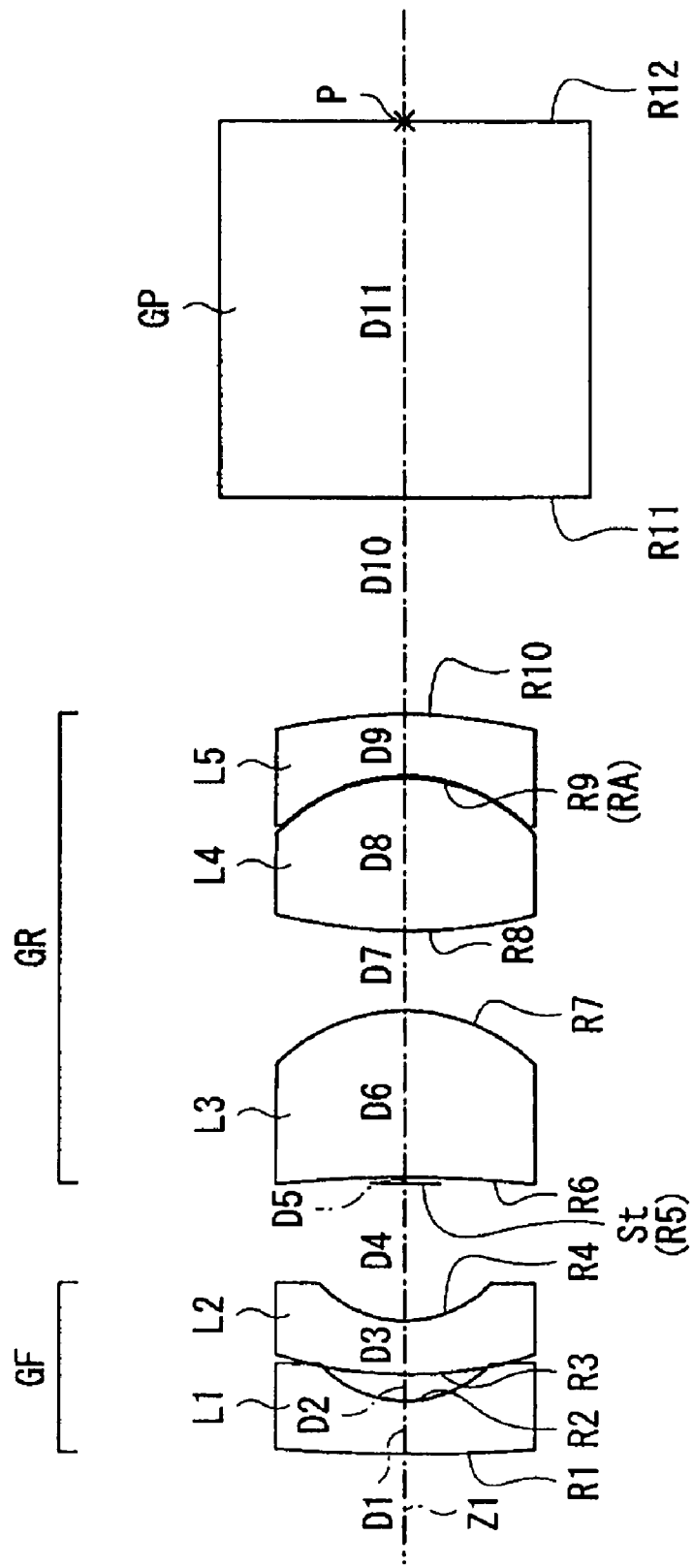
FIG. 3 is a lens section view corresponding to Example 3 and showing a third configuration example of the endoscope objective lens of the embodiment of the invention.
Figure 4:
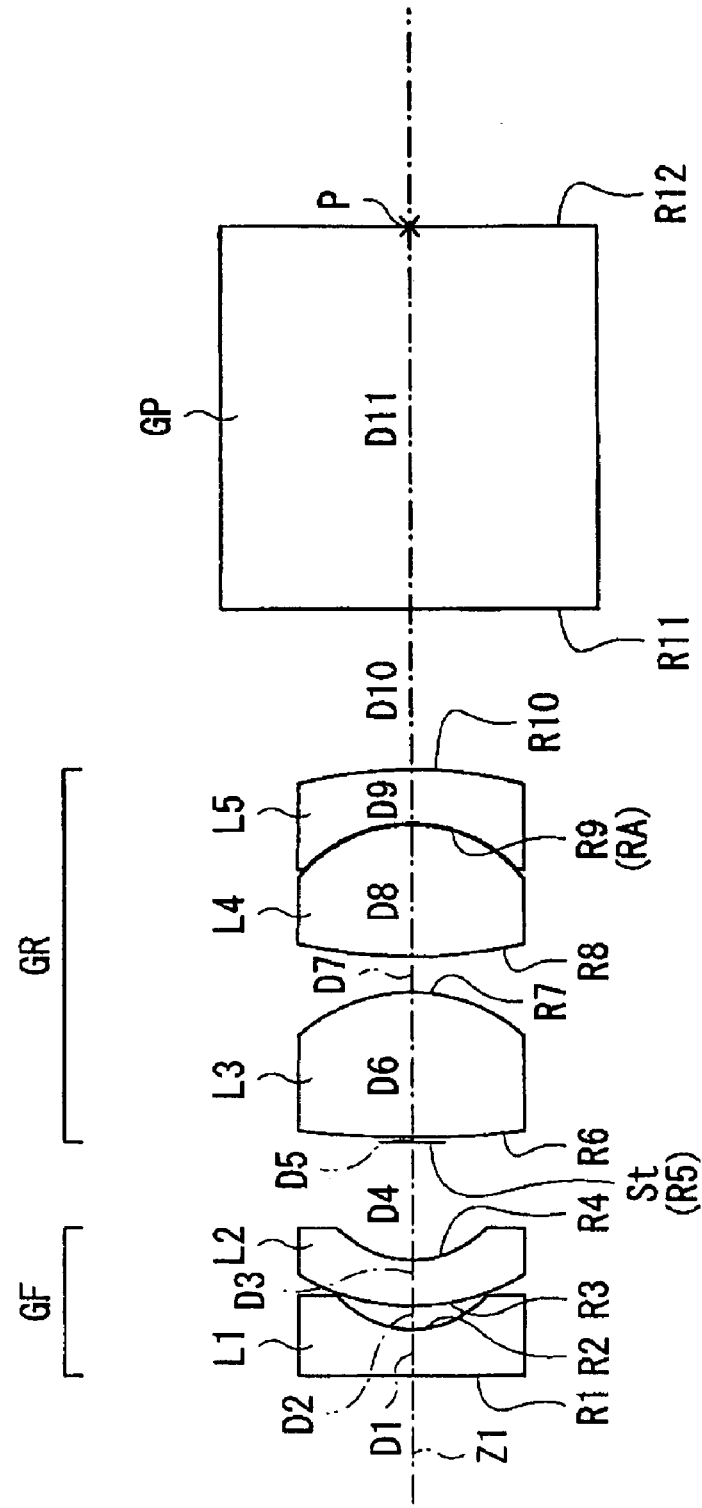
FIG. 4 is a lens section view corresponding to Example 4 and showing a fourth configuration example of the endoscope objective lens of the embodiment of the invention.
Figure 5:
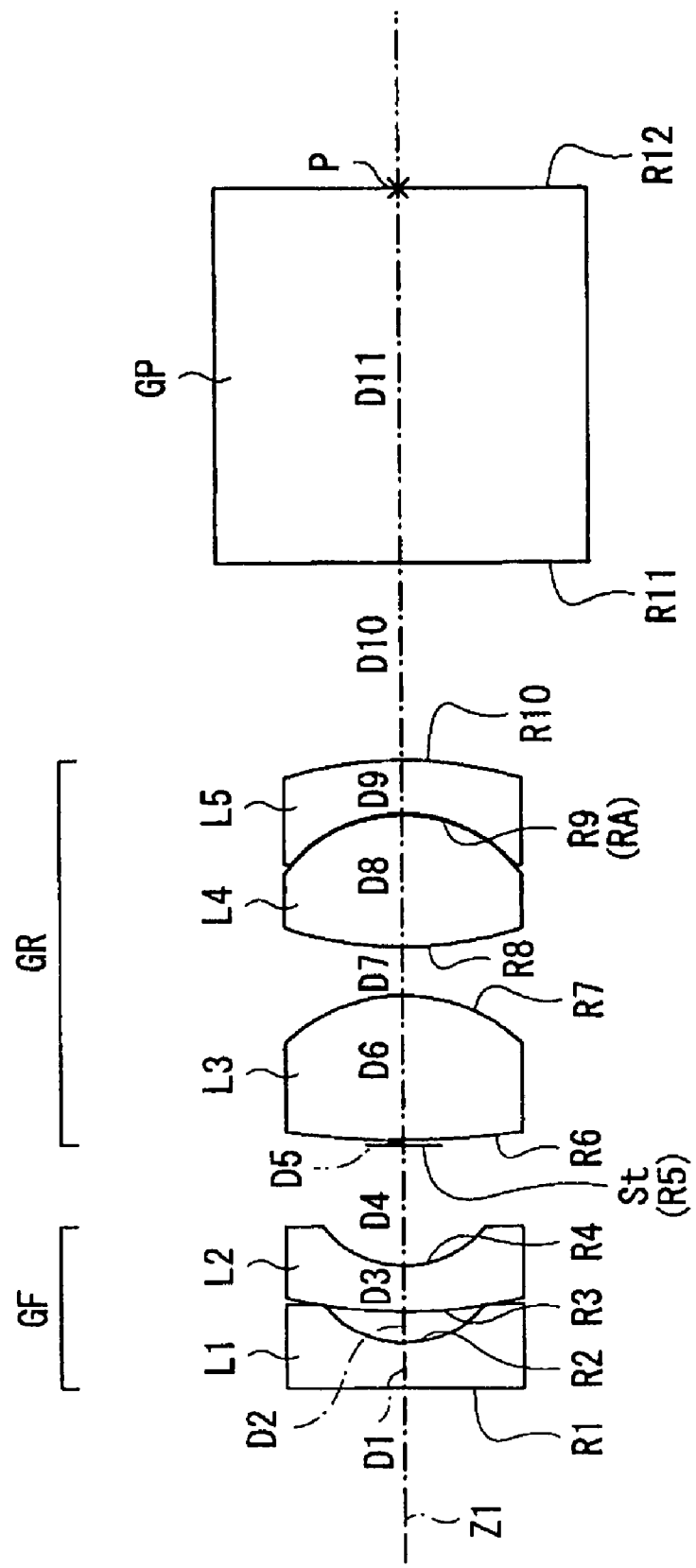
FIG. 5 is a lens section view corresponding to Example 5 and showing a fifth configuration example of the endoscope objective lens of the embodiment of the invention.
Figure 6:
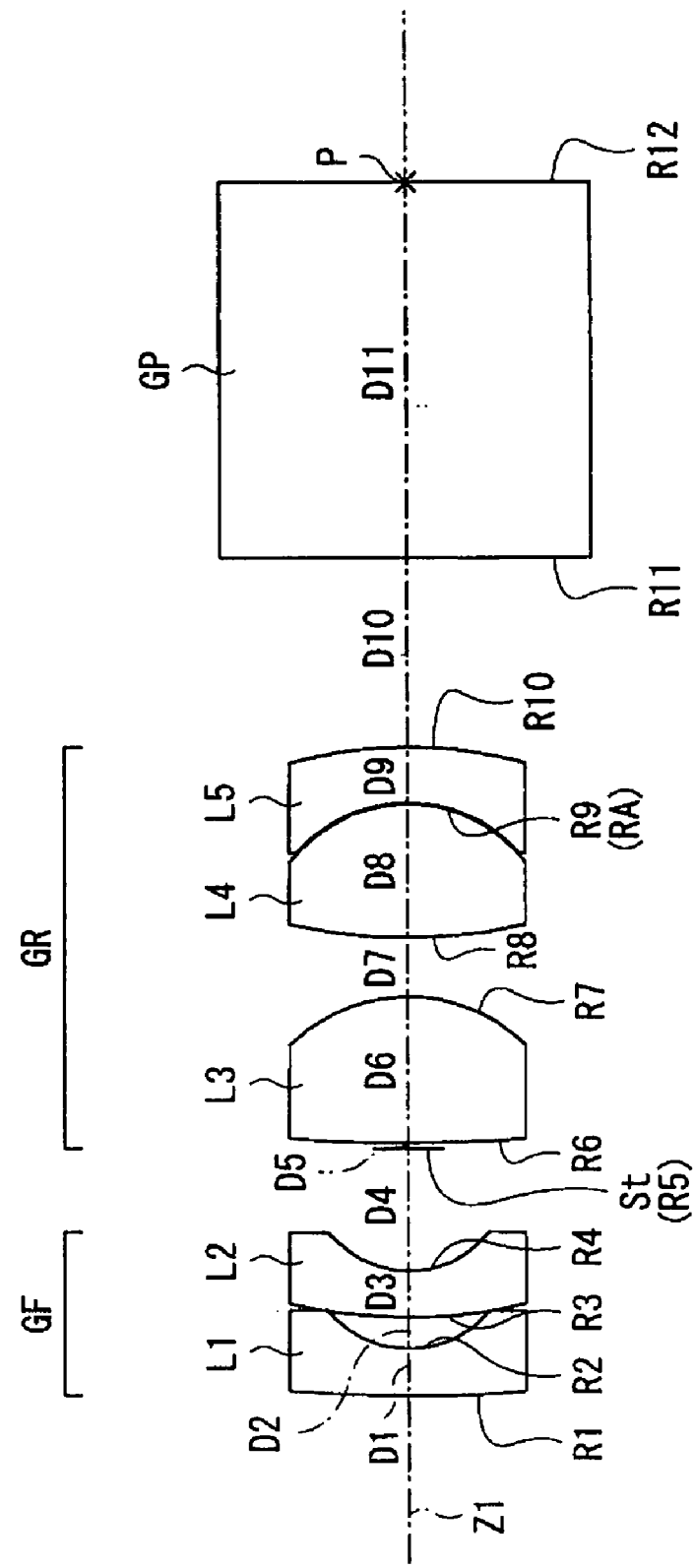
FIG. 6 is a lens section view corresponding to Example 6 and showing a sixth configuration example of the endoscope objective lens of the embodiment of the invention.

FIG. 1 shows a first configuration example of an endoscope objective lens of an embodiment of the invention. The configuration example corresponds to the lens configuration of a first numerical example (FIG. 8) which will be described later. FIG. 2 shows a second configuration example which corresponds to the lens configuration of a second numerical example (FIG. 9) which will be described later. FIG. 3 shows a third configuration example which corresponds to the lens configuration of a third numerical example (FIG. 10) which will be described later. FIG. 4 shows a fourth configuration example which corresponds to the lens configuration of a fourth numerical example (FIG. 11) which will be described later. FIG. 5 shows a fifth configuration example which corresponds to the lens configuration of a fifth numerical example (FIG. 12) which will be described later. FIG. 6 shows a sixth configuration example which corresponds to the lens configuration of a sixth numerical example (FIG. 13) which will be described later. In FIGS. 1 to 6, the reference character Ri indicates the radius of curvature of an i-th surface which is numbered in such a manner that the surface of a component that is closest to the object side is set as the first surface, and the number is more sequentially increased as further advancing toward the image side (imaging side). The reference character Di indicates the on-axis surface spacing on the optical axis Z1 between i-th and (i+1)-th surfaces. The configuration examples have the same basic configuration. Therefore, the following description will be made with focusing attention on the first configuration example shown FIG. 1.

The endoscope objective lens is suitably used as an objective lens of an endoscope in which a solid-state image pickup device is placed in a tip end portion parallel to the axial direction (longitudinal direction). The endoscope objective lens comprises, along the optical axis Z1 and sequentially from the object side, a front-group divergent lens system GF, an aperture diaphragm St, and a rear-group convergent lens system GR. An optical-path deflecting prism GP is placed on the side of the image-side surface of the endoscope objective lens. In FIGS. 1 to 6, P indicates an imaging position, and the optical-path deflecting prism GP is equivalently developed in the same direction as the incident optical axis Z1, and illustrated so that the imaging position P is in the in the same direction as the incidence optical axis Z1.

The front-group divergent lens system GF and the rear-group convergent lens system GR are formed as a four-group five-element lens configuration as a whole. The front-group divergent lens system GF has a negative refractive power as a whole, and is configured by two concave lenses, or a first lens L1 and a second lens L2. The first lens L1 has a shape in which a concave surface is directed to the image side, and is formed into, for example, a plano-concave shape. Alternatively, the lens may have a meniscus shape as in the configuration examples of FIGS. 3 and 6. For example, the second lens L2 has a meniscus shape in which a concave surface is directed to the image side.

The rear-group convergent lens system GR has a positive refractive power as a whole, and is configured sequentially from the object side by: a third lens L3 having a positive refractive power; and a cemented lens configured by a fourth lens L4 having a positive refractive power, and a fifth lens L5 having a negative meniscus shape. The third lens L3 has a shape in which the absolute value of the radius of curvature of the object-side surface is larger than that of the radius of curvature of the image-side surface, such as a bi-convex shape or a meniscus shape in which a concave surface is directed to the object side. Alternatively, the third lens may have a plano-convex shape. The fourth lens L4 has a shape in which the absolute value of the radius of curvature of the object-side surface is larger than that of the radius of curvature of the image-side surface, such as a bi-convex shape. The cemented lens configured by the fourth lens L4 and the fifth lens L5 has a positive refractive power as a whole.

The endoscope objective lens satisfies the following conditional expressions:

$$|d_x/f_F| \geq 3.0 \qquad (1)$$

$$(f/f_3) \times v_3 < 23 \qquad (2)$$

$$f^2 \times (v_5 - v_4)/\{R_4 \times (Bf + d_5/n_5)\} > 7 \qquad (3)$$

where $d_x$ is the distance between the rear principal point of the front-group divergent lens system GF and the front principal point of the rear-group convergent lens system GR, $f_F$ is the composite focal length of the front-group divergent lens system GF, f is the composite focal length of the objective lens, $f_3$ is the focal length of the third lens L3, $v_3$ is the Abbe number of the third lens L3, $v_4$ is the Abbe number of the fourth lens L4, $v_5$ is the Abbe number of the fifth lens L5, $R_4$ is the radius of curvature of the cementing surface between the fourth lens L4 and the fifth lens L5, $B_f$ is the back focus of the objective lens, $d_5$ is the center thickness of the fifth lens L5, and $n_5$ is the refractive index of the fifth lens L5 with respect to the d-line.

Figures 7, 8:
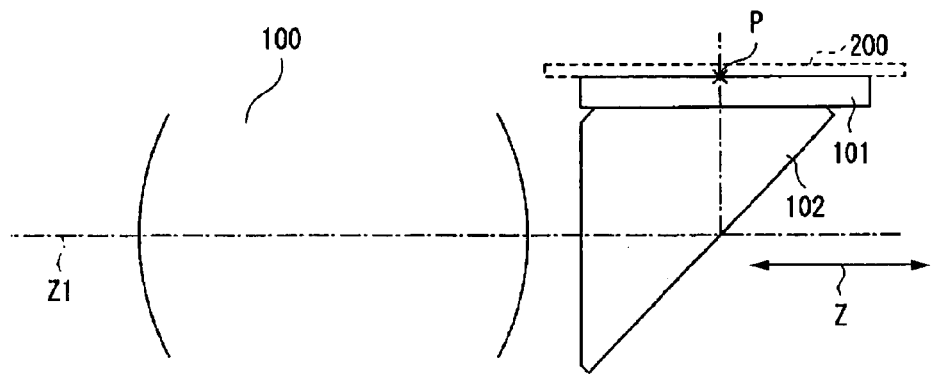
FIG. 7 shows a configuration example of an imaging apparatus for endoscope of the embodiment of the invention.
FIG. 8 shows lens data of an endoscope objective lens of Example 1 of the invention.

FIG. 7 shows a configuration example of an imaging apparatus for endoscope of the embodiment. In the imaging apparatus, a solid-state image pickup device 200 is placed in a tip end portion of an endoscope parallel to the axial direction (Z). The solid-state image pickup device 200 is connected to an external monitor or the like via a signal line which is not shown. An optical-path deflecting prism 102 is inserted and placed via a cover glass 101 between the solid-state image pickup device 200 and an objective lens 100. As the objective lens 100, the endoscope objective lens of the embodiment is suitably used. Since the optical-path deflecting prism 102 is inserted and placed, the optical axis Z1 of the objective lens 100 is bent by about 90 degree in the direction of the solid-state image pickup device 200. The solid-state image pickup device 200 outputs an image signal corresponding to an optical image formed by the objective lens 100. The image signal is supplied to the external monitor or the like via the signal line which is not shown, and viewed thereon as an observation image.

Next, the function and effects of the thus configured endoscope objective lens will be described.

According to the endoscope objective lens, in the lens system in which the front-group divergent lens system GF, the aperture diaphragm St, and the rear-group convergent lens system GR are placed sequentially from the object side, the refractive powers and shapes of the lenses of the groups are adequately set, and conditional expressions (1) to (3) are satisfied, whereby aberrations, particularly axial chromatic aberration and lateral chromatic aberration are corrected in a well balanced manner while ensuring a back focus which is three or more times the focal length of the objective lens. Hereinafter, specific functions of the conditional expressions will be described.

Conditional expression (1) is an expression for obtaining a back focus which is three or more times the focal length of the objective lens. In two thin lenses, the focal length of one of the lenses is indicated by $f_a$, that of the other lenses is indicated by $f_b$, and the distance of the two lenses is indicated by $d_x$. Then, the composite focal length f of the two lenses, and the back focus $B_f$ are indicated as follows:

$$1/f = 1/f_a + 1/f_b - d_x/(f_a \cdot f_b) \qquad (a)$$

$$Bf = f(1 - d_x/f_a) \qquad (b)$$

It is assumed that the back focus Bf is three times the focal length f, i.e., $$Bf = 3f \qquad (c)$$

is set. Then, $$3f = f(1 - d_x/f_a) \qquad (d)$$

is obtained. Therefore, the following is attained $$d_x = -2f_a \qquad (e)$$

In the embodiment, the composite focal lengths of the groups are indicated as follows:

$f_F$: the composite focal length of the front-group divergent lens system GF, and $f_R$: the composite focal length of the rear-group convergent lens system GR. Therefore, $f_F$ corresponds to $f_a$, and $f_R$ to $f_b$. Furthermore, $f_F<0$, and $f_R>0$ When $$d_x \geq 2|f_F| \quad (f)$$

is attained, the following is realized $$Bf \geq 3f \quad (g)$$

In an actual optical system, however, the rear principal point of the rear-group convergent lens system GR is located at a position which enters the lens by about a half of the composite focal length f of the objective lens. When the value of the back focus in which the above is considered is indicated by (Bf)', the following is obtained:

$$(Bf)' = 4f \quad (h)$$

By substituting this expression for expression (c) above, conditional expression (1) is obtained.

When conditional expression (1) is satisfied, the back focus Bf which is three or more times the composite focal length f of the objective lens can be ensured, and, even when the optical-path deflecting prism is inserted and placed between the solid-state image pickup device placed in the axial direction and the objective lens, in a tip end portion of the endoscope, it is possible to form an object image on the solid-state image pickup device.

Conditional expressions (2) and (3) relate to the optical elements of the rear-group convergent lens system GR. In an optical system behind an aperture, when, for example, the Abbe number of a positive lens is increased, usually, both the values of axial chromatic aberration and lateral chromatic aberration in which red (e.g., the C-line) is subtracted from blue (e.g., the F-line) move in the positive direction. In the embodiment, axial chromatic aberration has a positive value, and lateral chromatic aberration has a negative value. When the absolute value of negative lateral chromatic aberration is reduced, therefore, axial chromatic aberration moves in a reverse manner, or is increased. In order to satisfactorily correct the both, consequently, conditional expressions (2) and (3) must be simultaneously satisfied. The F-line has a wavelength of 486.13 nm, and the C-line has a wavelength of 656.27 nm.

In conditional expression (2), the Abbe number of the positive lens L3 of the rear-group convergent lens system GR is multiplied with the power of the positive lens L3. When conditional expression (2) is satisfied, excessively corrected axial chromatic aberration is suppressed by the effect of over increasing lateral chromatic aberration and axial chromatic aberration of the cemented lens.

Conditional expression (3) shows the degree of correction on lateral chromatic aberration of the cementing surface of the cemented lens configured by the positive and negative lenses L4, L5 of the rear-group convergent lens system GR. Specifically, in the conditional expression, the difference of the Abbe numbers of the positive and negative lenses L4, L5 is divided by the radius of curvature $R_A$ of the cementing surface which is normalized by the focal length, and a value which is obtained by adding the air reduced length $d_5/n_5$ of the negative lens L5 to the overall back focus Bf. When conditional expression (3) is satisfied, i.e., when, as the Abbe number is larger, the radius of curvature of the cementing surface is smaller, and the cementing surface is closer to the imaging position, the correction of lateral chromatic aberration is more advantageous.

As described above, according to the endoscope objective lens of the embodiment, in the lens system in which the front-group divergent lens system GF, the aperture diaphragm St, and the rear-group convergent lens system GR are placed sequentially from the object side, the refractive powers and surface shapes of the lenses are adequately set, and conditional expressions (1) to (3) are satisfied. Therefore, axial chromatic aberration and lateral chromatic aberration can be satisfactorily corrected in a well balanced manner while ensuring a back focus having a sufficient length which can allow the optical-path deflecting prism GP to be inserted and placed on the side of the image-side surface.

In the imaging apparatus for endoscope of the embodiment, the endoscope objective lens of the embodiment is used, and therefore an excellent observation image can be obtained from an image signal corresponding to an optical image formed by the objective lens.

In the above description, it is assumed that the lens system has the overall back focus Bf which is longer than three times of the overall composite focal length f. When the back focus Bf is long, a large optical-path deflecting prism GP can be inserted. In this case, the size of the prism can be increased with respect to the effective light flux, and hence it is advantageous to suppression of occurrence of ghost or flare. In the case where the size of the prism is not increased, a sufficient distance can be ensured between the final lens and the optical-path deflecting prism GP, and there is an advantage that an insertion of a filter or the like can be easily performed as required.

EXAMPLES

Next, specific numerical examples of the endoscope objective lens of the embodiment will be described. Hereinafter, the first to sixth numerical examples (Examples 1 to 6) will be collectively described.

FIG. 8 shows lens data of an endoscope objective lens of Example 1. In the column of the surface number Si in the lens data shown in FIG. 8, the number of an i-th (i=1 to 12) surface which is numbered in such a manner that the surface of a component that is closest to the object side is set as the first surface, and the number is more sequentially increased as further advancing toward the image side is shown. In the column of the radius of curvature Ri, the value (mm) of the radius of curvature of the i-th surface counted from the object side is shown in correspondence to the reference character Ri used in FIG. 1. Also in the column of the on-axis surface spacing Di, the separation (mm) on the optical axis between an i-th surface Si counted from the object side and an (i+1)-th surface Si+1 is shown. In the figure, ndj indicates the value of the refractive index with respect to the d-line (wavelength=587.6 nm) between adjacent lens surfaces. In the column of vdj, the value of the Abbe number of the j-th (j=1 to 6) optical component counted from the object side with respect to the d-line is shown. The values of the radius of curvature Ri and the on-axis surface spacing Di are normalized so that the composite focal length f of the objective lens is 1 mm.

In the same manner as the endoscope objective lens of Example 1 described above, FIG. 9 shows lens data of an endoscope objective lens of Example 2. Similarly, FIG. 10 shows lens data of an endoscope objective lens of Example 3. Similarly, FIG. 11 shows lens data of an endoscope objective lens of Example 4. Similarly, FIG. 12 shows lens data of an endoscope objective lens of Example 5. Similarly, FIG. 13 shows lens data of an endoscope objective lens of Example 6. Also in Examples 2 to 6, in the same manner as Example 1, the values of the radius of curvature Ri and the on-axis surface spacing Di are normalized so that the composite focal length f of the objective lens is 1 mm.

Figure 22:
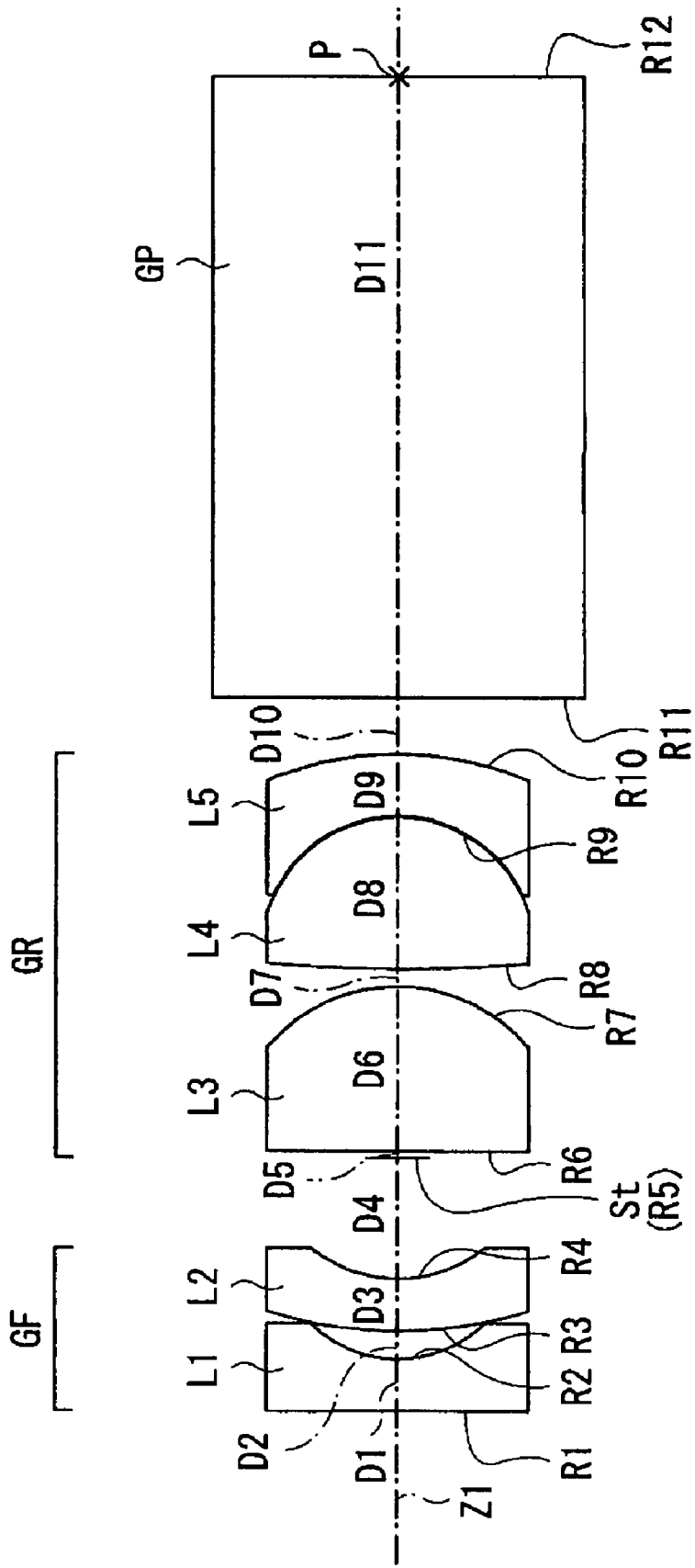
FIG. 22 is a section view showing the configuration of an endoscope objective lens of the comparative example.
Figures 23, 24A, 24B, 24C, 24D:
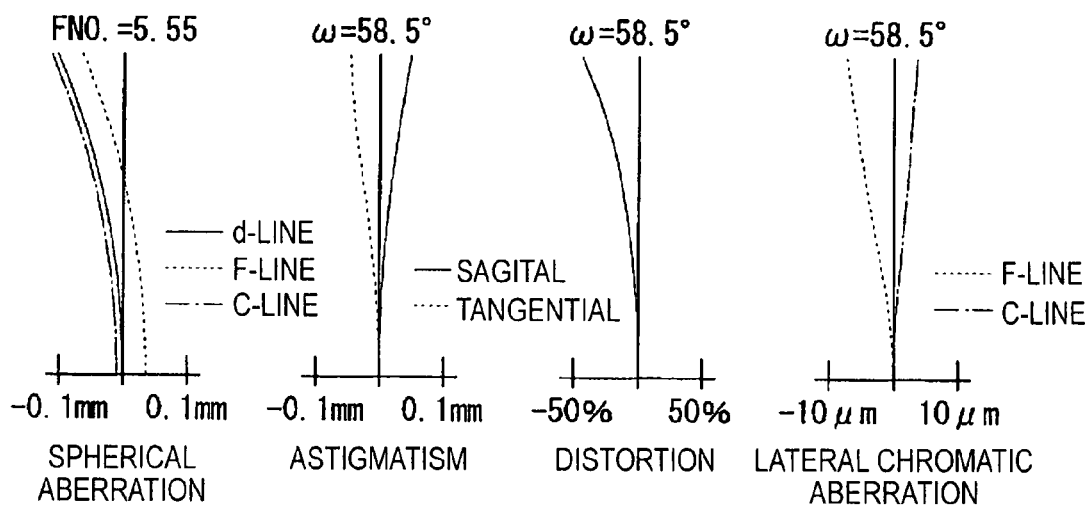
FIG. 23 is a view showing lens data of the endoscope objective lens of the comparative example.
FIG. 24A is a view showing spherical aberration of the endoscope objective lens of the comparative example.
FIG. 24B is a view showing astigmatism of the endoscope objective lens of the comparative example.
FIG. 24C is a view showing distortion of the endoscope objective lens of the comparative example.
FIG. 24D is a view showing lateral chromatic aberration of the endoscope objective lens of the comparative example.

FIG. 22 shows the section configuration of an endoscope objective lens of the comparative example with respect to Examples 1 to 6, and FIG. 23 shows lens data of the comparative example. The portions corresponding to those of the endoscope objective lenses of Examples 1 to 6 are denoted by the same reference numerals. The values of the radius of curvature Ri and the on-axis surface spacing Di are normalized so that the composite focal length f of the objective lens is 1 mm. The comparative example is described as Example 1 in JP-A-10-260348.

As values relating to the conditional expressions and the like in the endoscope objective lenses of Examples 1 to 6 and the comparative example, FIG. 14 shows the image size, the object distance, the field angle (2ω), the focal length f, the back focus Bf, the composite focal length of the front-group divergent lens system GF, the position of the rear principal point of the front-group divergent lens system GF, the position of the front principal point of the rear-group convergent lens system GR, the focal length $f_3$ of the third lens L3, the value (F-line–C-line) of axial chromatic aberration, the value (F-line–C-line) of lateral chromatic aberration at the extreme field angle, and the values of conditional expressions (1) to (3). The C-line has a wavelength of 656.27 nm, and the F-line has a wavelength of 486.13 nm. As shown in FIG. 13, Examples 1 to 6 are within the numerical ranges of conditional expressions (1) to (3), and the value of the back focus Bf is ensured to be three or more times the focal length of the objective lens. The comparative example satisfies conditional expressions (1) and (3), but is outside the range of conditional expression (2).

Figure 15:
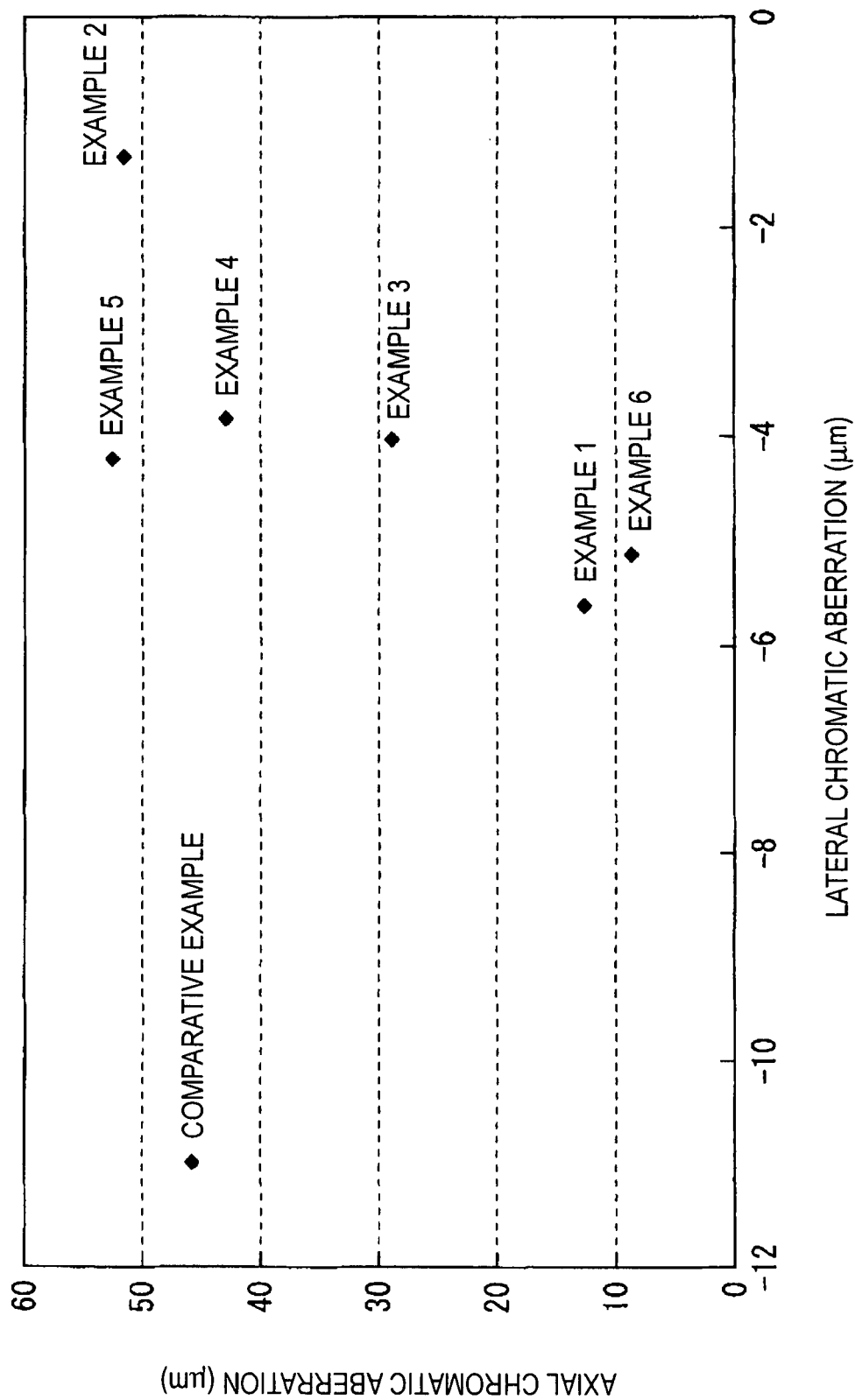
FIG. 15 is a view showing values of axial chromatic aberration and lateral chromatic aberration in Examples 1 to 6 of the invention and a comparative example.
Figures 16A, 16B, 16C, 16D:
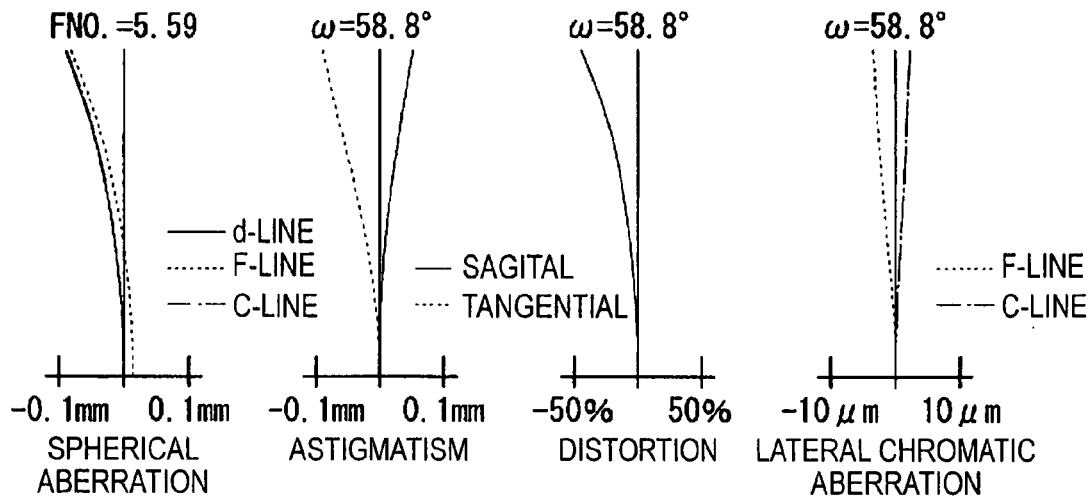
FIG. 16A is a view showing spherical aberration of the endoscope objective lens of Example 1 of the invention.
FIG. 16B is a view showing astigmatism of the endoscope objective lens of Example 1 of the invention.
FIG. 16C is a view showing distortion of the endoscope objective lens of Example 1 of the invention.
FIG. 16D is a view showing lateral chromatic aberration of the endoscope objective lens of Example 1 of the invention.
Figures 17A, 17B, 17C, 17D:
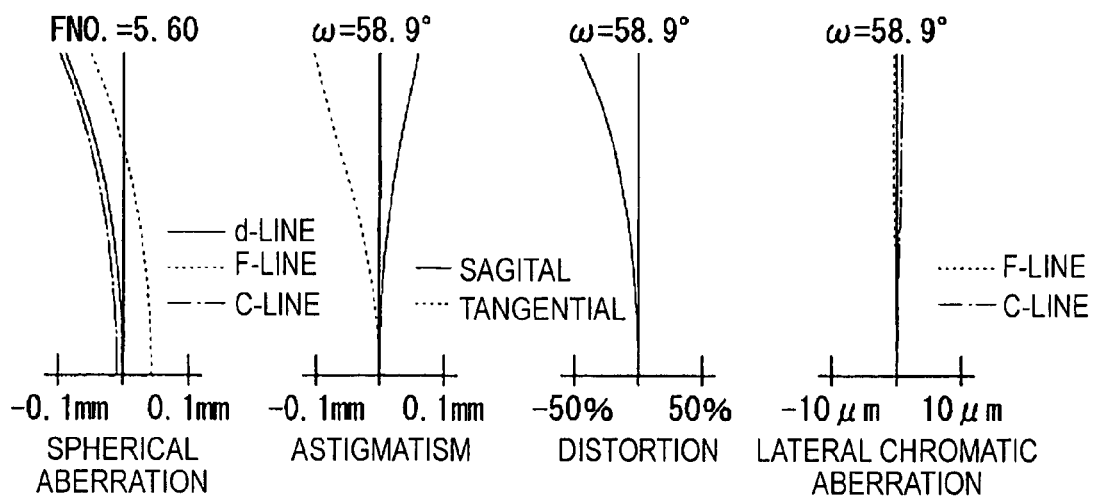
FIG. 17A is a view showing spherical aberration of the endoscope objective lens of Example 2 of the invention.
FIG. 17B is a view showing astigmatism of the endoscope objective lens of Example 2 of the invention.
FIG. 17C is a view showing distortion of the endoscope objective lens of Example 2 of the invention.
FIG. 17D is a view showing lateral chromatic aberration of the endoscope objective lens of Example 2 of the invention.
Figures 18A, 18B, 18C, 18D:
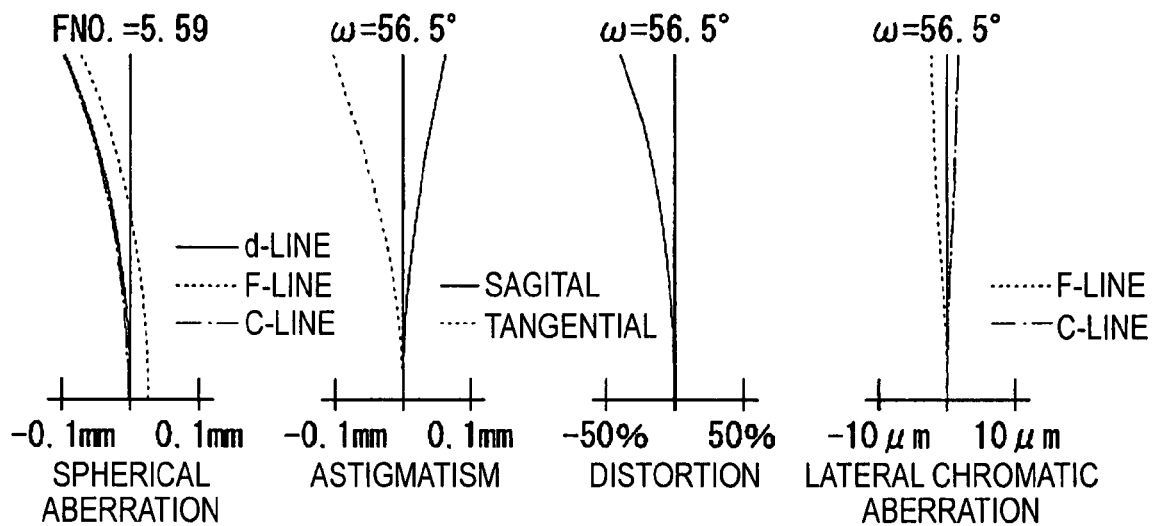
FIG. 18A is a view showing spherical aberration of the endoscope objective lens of Example 3 of the invention.
FIG. 18B is a view showing astigmatism of the endoscope objective lens of Example 3 of the invention.
FIG. 18C is a view showing distortion of the endoscope objective lens of Example 3 of the invention.
FIG. 18D is a view showing lateral chromatic aberration of the endoscope objective lens of Example 3 of the invention.
Figures 19A, 19B, 19C, 19D:
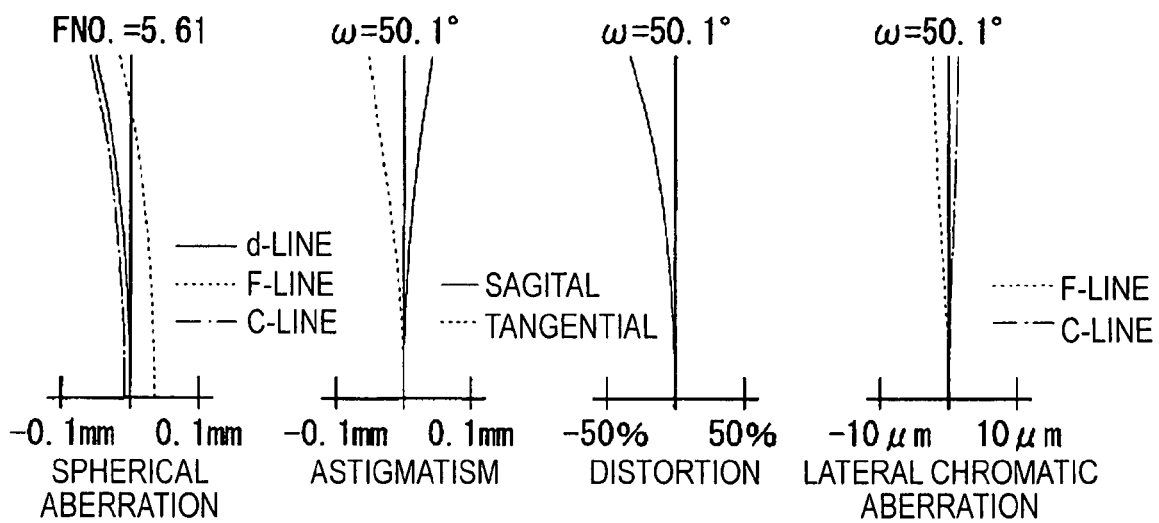
FIG. 19A is a view showing spherical aberration of the endoscope objective lens of Example 4 of the invention.
FIG. 19B is a view showing astigmatism of the endoscope objective lens of Example 4 of the invention.
FIG. 19C is a view showing distortion of the endoscope objective lens of Example 4 of the invention.
FIG. 19D is a view showing lateral chromatic aberration of the endoscope objective lens of Example 4 of the invention.
Figures 20A, 20B, 20C, 20D:
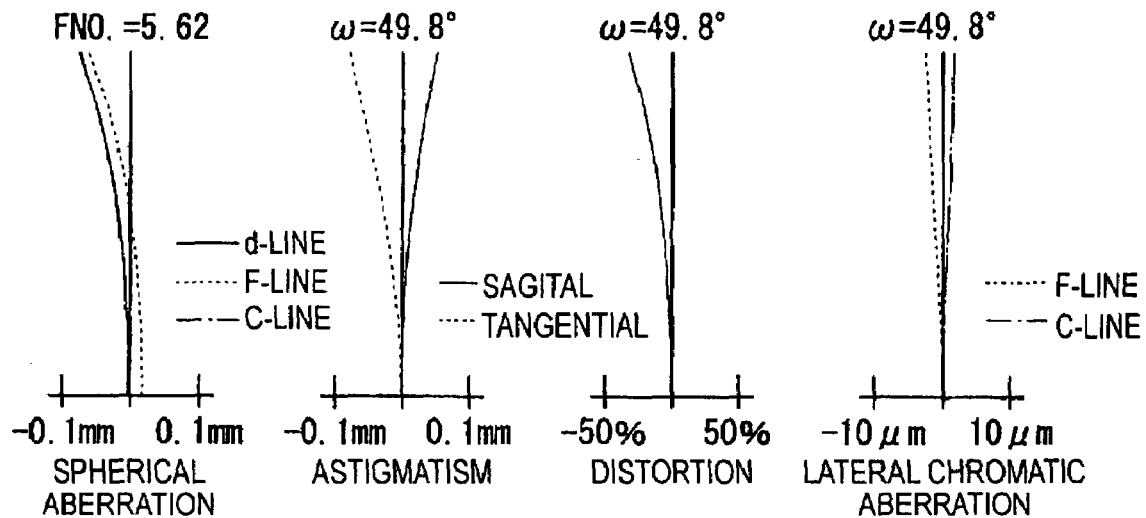
FIG. 20A is a view showing spherical aberration of the endoscope objective lens of Example 5 of the invention.
FIG. 20B is a view showing astigmatism of the endoscope objective lens of Example 5 of the invention.
FIG. 20C is a view showing distortion of the endoscope objective lens of Example 5 of the invention.
FIG. 20D is a view showing lateral chromatic aberration of the endoscope objective lens of Example 5 of the invention.
Figures 21A, 21B, 21C, 21D:
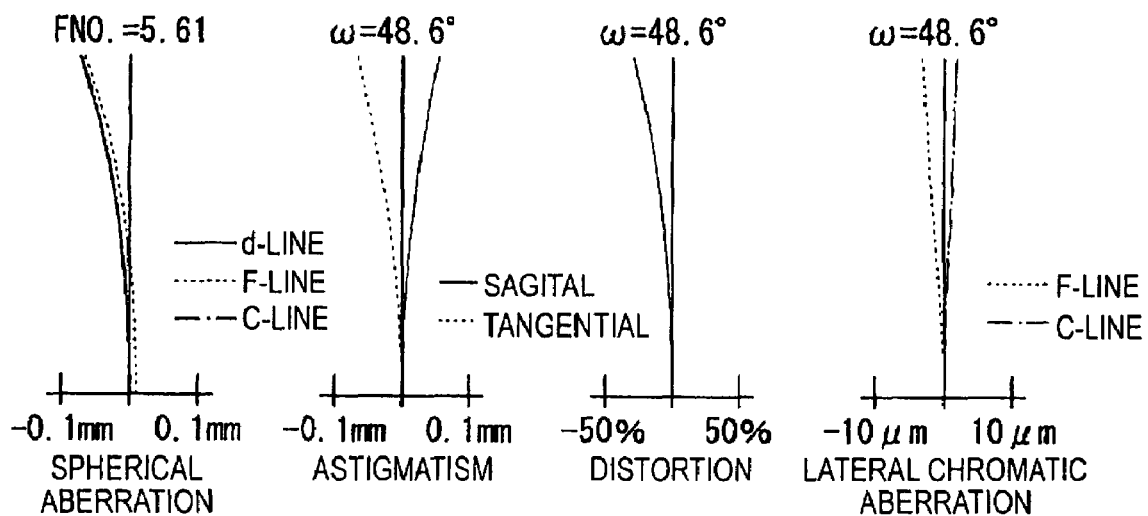
FIG. 21A is a view showing spherical aberration of the endoscope objective lens of Example 6 of the invention.
FIG. 21B is a view showing astigmatism of the endoscope objective lens of Example 6 of the invention.
FIG. 21C is a view showing distortion of the endoscope objective lens of Example 6 of the invention.
FIG. 21D is a view showing lateral chromatic aberration of the endoscope objective lens of Example 6 of the invention.

FIG. 15 shows plots of the value of axial chromatic aberration (the ordinate) and that of lateral chromatic aberration (the abscissa) with respect to Examples 1 to 6 and the comparative example. As shown in FIG. 15, axial chromatic aberration and lateral chromatic aberration approximately contradict each other. In Examples 1 to 6, however, lateral chromatic aberration is satisfactorily corrected without largely increasing axial chromatic aberration, and the aberration amount is extremely improved as compared with the comparative example. This is an effect which is attained by simultaneously satisfying conditional expressions (2) and (3).

FIGS. 16A to 16D show the spherical aberration, astigmatism, distortion (distortion aberration), and lateral chromatic aberration of the endoscope objective lens of Example 1, respectively. Each aberration diagram shows aberration in which the d-line is set as the reference wavelength. In the spherical aberration diagram, also aberrations with respect to the C- and F-lines are shown. Lateral chromatic aberration of magnification with respect to the C- and F-lines are shown. F No. indicates the F-number, and ω indicates the half field angle.

Similarly, FIGS. 17A to 17D show the aberrations of the endoscope objective lens of Example 2, FIGS. 18A to 18D show the aberrations of the endoscope objective lens of Example 3, FIGS. 19A to 19D show the aberrations of the endoscope objective lens of Example 4, FIGS. 20A to 20D show the aberrations of the endoscope objective lens of Example 5, and FIGS. 21A to 21D show the aberrations of the endoscope objective lens of Example 6. Similarly, FIG. 24A to 24D show the aberrations of the endoscope objective lens of the comparative example.

As seen from the numeral data and the aberration diagrams, all the examples can realize an endoscope objective lens in which axial chromatic aberration and lateral chromatic aberration can be satisfactorily corrected in a well balanced manner while ensuring a back focus which is three or more times the focal length of the objective lens.

The invention is not restricted to the embodiment and the examples, and various modifications are enabled. For example, the radius of curvature, the on-axis surface spacing, and the refractive index of each lens component, and the like are not limited to the values of the numerical examples, and may have other values.

According to the objective lens for endoscope of the invention, in the optical system in which the front-group divergent lens system and the rear-group convergent lens system are placed on both sides of the aperture diaphragm, the refractive powers and shapes of the lenses of the groups are adequately set, and particularly the optical elements of the rear-group convergent lens system satisfy the predetermined conditional expressions. Therefore, axial chromatic aberration and lateral chromatic aberration can be satisfactorily corrected while ensuring a back focus having a sufficient length that allows insertion placement of an optical-path deflecting prism.

According to the imaging apparatus for endoscope of the invention, an image signal corresponding to an optical image formed by the high-performance objective lens for endoscope of the invention is output, and therefore an excellent observation image can be obtained from the image signal.

The entire disclosure of each and every foreign patent application from which the benefit of foreign priority has been claimed in the present application is incorporated herein by reference, as if fully set forth.

What is claimed is:

1. An objective lens for endoscope, comprising, in order from an object side:

a front-group divergent lens system;

an aperture diaphragm; and a rear-group convergent lens system, wherein the front-group divergent lens system comprises first and second lenses which are negative lenses, the rear-group convergent lens system is configured in order from an object side by: a positive third lens in which an object-side surface is larger in absolute value of a radius of curvature than an image-side surface; and a cemented lens configured by a positive fourth lens in which an object-side surface is larger in absolute value of a radius of curvature than an image-side surface and a fifth lens having a negative refractive power and a meniscus shape, the cemented lens having a positive refractive power as a whole, and the objective lens satisfies following conditional expressions:

$$|d_x/f_F| \geq 3.0 \quad (1)$$

$$(f/f_3) \times v_3 < 23 \quad (2)$$

$$f^2 \times (v_5 - v_4) / \{R_4 \times (Bf + d_5/n_5)\} > 7 \quad (3)$$

where $d_x$: distance between a rear principal point of the front-group divergent lens system and a front principal point of the rear-group convergent lens system, $f_F$: composite focal length of the front-group divergent lens system, f: composite focal length of the objective lens, $f_3$: focal length of the third lens, $v_3$: Abbe number of the third lens, $v_4$: Abbe number of the fourth lens, $v_5$: Abbe number of the fifth lens, $R_4$: radius of curvature of a cementing surface between the fourth lens and the fifth lens, $B_f$: back focus of the objective lens, $d_5$: center thickness of the fifth lens, and $n_5$: refractive index of the fifth lens with respect to the d-line.

2. An imaging apparatus for endoscope, comprising:
an objective lens for endoscope according to claim 1; and
an image pickup device that outputs an image signal corresponding to an optical image formed by the endoscope objective lens.

* * * * *